3,754,076
PRODUCTION OF SILICON CARBIDE FROM RICE HULLS

Ivan B. Cutler, Salt Lake City, Utah, assignor to University of Utah
No Drawing. Filed Oct. 30, 1970, Ser. No. 85,698
Int. Cl. C01b *31/36, 53/02, 47/00*
U.S. Cl. 423—345      8 Claims

ABSTRACT OF THE DISCLOSURE

This invention discloses the production of silicon carbide from the silica and carbon present in rice hulls.

---

It has been estimated that in California alone over 200,000 tons of rice hulls are produced annually as a byproduct of rice milling. Although it would seem logical to return the hulls to the land from which they came, their bulk makes transportation costs to outlying rice district prohibitive. Burning has been the primary means of disposal in the past, with some outlet for the ash as a grease and oil absorbing sweeping compound for use in service stations and garages. The availability of burning sites has continually decreased and practically the only hulls being burned now are in expensive burning sheds. Burning with its attendent problems of air pollution and ash disposal has proven to be an unsatisfactory solution.

Not only does burning create pollution problems but the extremely fine silica ash is also toxic and thus constitutes a health hazard. Even careful incineration procedures cannot completely eliminate this airborne silica ash.

What is proposed instead, is that the rice hulls be changed from a nuisance byproduct of rice milling into a valuable raw material for the production of silicon carbide. Rice hulls contain approximately 15 to 20 percent by weight crude ash which in turn consists of about 95 percent silica ($SiO_2$). It is the silicon in this silica that is reacted with the carbon in the organic matter of the rice hulls to form silicon carbide. Silicon carbide is formed by retorting rice hulls in preferably an inert atmosphere. In addition to an inert atmosphere, means are employed to remove the gases and other vapors as they form and use the same to assist the reaction between the silicon and carbon.

Catalysis of the reaction is conveniently accomplished by the addition of iron or iron compounds or transition element or its compound such as chromium, nickel, etc. to the substance in the retort. Thermodynamically, the use of a catalyst is not necessary as temperature and partial pressure alone designate the conditions for stability of silicon carbide in the presence of carbon and silica. As a result of catalysis with iron, etc., the reaction between silicon and carbon to form silcon carbide occurs at a much faster rate than an uncatalyzed reaction in a furnace at comparable temperatures.

It is therefore an object of this invention to provide a means for producing silcon carbide from rice hulls.

It is another object of this invention to turn an unwanted agricultural byproduct into a valuable raw material.

It is an even further object of this invention to provide a means of producing silicon carbide at a temperature lower than prior art methods by catalyzing the reaction with iron or other transition elements.

It is another object of this invention to provide improvements in the production of silicon carbide from rice hulls.

These and other objects of this invention will become apparent from the following description.

At present, silicon carbide is manufactured by heating finely divided coal and quartz sand in an electric resistance furnace. The furnace is heated to temperatures on the order of about 2500° C. Much of the electrical energy consumed is utilized in the endothermic formation of the silicon carbide crystals. Silicon carbide is formed from the reaction $$SiO_2 + 3C = SiC + 2CO$$

Silicon carbide (SiC) is a covalently bonded crystalline material of extreme hardness. It has two primary crystal modifications, a low temperature cubic form similar to diamond and a high temperature hexagonal form. Almost all of the silicon carbide utilized at the present time is of high temperature, hexagonal modification. However, the low temperature cubic silicon carbide has many of the same properties as the high temperature form including the extereme hardness of the high temperature modification.

In the manufacture of silicon carbide in the electric resistance furnace, quartz sand and coal are intimately mixed in a finely divided state in order to produce an economical reaction. Silica in rice hulls is therefore valuable for this reaction since the silica in the rice hulls is already in an extremely finely divided state and in intimate contact with the carbon of the cellulose comprising the rice hull material. In addition the silica is in a more reactive condition in rice hulls as it is in an amorphous state similar to silica gel. As a result, grinding or otherwise intimately mixing the silca and carbon mixture is not required for this reaction. With the high surface area available from the silica in rice hulls, silicon carbide is formed readily and economically. Heat energy for the reaction is provided by available energy sources in the rice hull itself; that is, the excess carbon present in the hull. This, of course, means that some sort of combustion system is required for the rice hulls. An upper temperature limit of about 1700° C. is an approximate economic limit for the temperature of such a combustion system.

To be economically processed near the source of the rice hulls, the reaction must occur at a reasonable rate at temperatures somewhat below 1700° C. It is for this reason that iron either in a form of iron oxide or iron metal or some other compound of iron or one of the other transition elements is used as a catalyst for the reaction to catalyze the formation of silicon carbide. The combination of iron as a catalyst for the reaction in addition to the very high surface area available from the silica in rice hulls provides that the silicon carbide can be readily and economically formed at temperatures on the order of about 1400° to 1600° C.

Other than silica, rice hulls are made up of substances such as cellulose which decompose when heated to give off gaseous products such as carbon dioxide, carbon monoxide, hydrogen, methane, and water vapor. Removal of such gaseous products from the reaction chamber will be necessary in order to economically produce silcon carbide from rice hulls. Combustion of the carbon associated with the cellulose of the rice hulls will mean that many of the above gaseous products will be consumed in combustion and result in combustion products such as carbon dioxide, carbon monoxide and water vapor. Since carbon monoxide is a reaction product of the reaction that produces silicon carbide, it will be necessary to lower the partial pressure of the resulting carbon monoxide to a level as low as possible to facilitate the reaction progressing in the proper direction. Excessive carbon monoxide present impedes the formation of the silicon carbide as is well known in the art of chemical equations.

In the presently preferred embodiment of this invention, rice hulls are introduced into a furnace and are therein heated to on the order of about 1200 to 1500° C. Gaseous emissions from the rice hulls, particularly the carbon monoxide, are conducted away from the material in the furnace. The carbon monoxide is evacuated from the furnace or flushed from the furnace with an inert gas such as nitrogen, etc. Removal of the carbon monoxide lowers the partial pressure of the carbon monoxide with the result that the reaction between silicon and carbon to form silicon carbide proceeds more rapidly.

Heat energy to the furnace is supplied by combustion of the excess carbon present in the cellulose in the rice hull or may be supplied by another source such as natural gas. Natural gas heat may either be supplied directly into the rice hull material or supplied indirectly to the external surface of the furnace. In either event it is unnecessary to use electrical energy as the heat energy source with a resulting savings in cost of production of silicon carbide. Retorting the rice hull material to form silicon carbide may prove to be the more economical system of producing silicon carbide. Preventing the flame from contacting the silicon carbide as it is formed in the retort serves to prevent destruction by the flame itself of the silicon carbide as it is formed.

I claim:

1. A method of producing silicon carbide from rice hulls, comprising the step of:
heating rice hulls in the absence of oxygen to a temperature within the range of about 1000° C. to 2000° C. at which temperature silicon carbide is formed solely by a reaction between silicon and carbon naturally present in said rice hulls, said rice hulls comprising the sole raw material for the production of said silicon carbide.

2. A method of producing silicon carbide from rice hulls as defined in claim 1 wherein said heating step is within the range of 1200° C. to 1700° C.

3. A method of producing silicon carbide from rice hulls as defined in claim 1 wherein said reaction is catalyzed by an element either singly or in combination with other elements selected from a group of transition elements comprising iron, chromium, and nickel.

4. A method of producing silicon carbide from rice hulls as defined in claim 3 wherein said iron is present in the form of iron oxide.

5. A method of producing silicon carbide from rice hulls as defined in claim 1 wherein gaseous products are produced and removed from said rice hulls as said gaseous products are formed.

6. A method of producing silicon carbide from rice hulls as defined in claim 5 wherein said gaseous products are removed by flushing with an inert gas.

7. A method of producing silicon carbide from rice hulls as defined in claim 5 wherein carbon monoxide is one of said gaseous products.

8. An improved method of producing silicon carbide from rice hulls, comprising the steps of:
(a) heating rice hulls and a catalyst in atmosphere substantially free from oxygen in a furnace to a temperature within the range of about 1200° C. to 1700° C. thereby forming silicon carbide solely from the reaction of silicon and carbon naturally present in said rice hulls and forming gaseous products including carbon monoxide; and
(b) evacuating at least some of said carbon monoxide from said furnace thereby lowering the partial pressure of said carbon monoxide.

References Cited

UNITED STATES PATENTS

| 2,018,133 | 10/1935 | Kirchner | 23—208 A |
| 1,327,737 | 1/1920 | Reid | 23—208 RX |

FOREIGN PATENTS

| 1,536,842 | 7/1968 | France | 23—208 A |
| 969,538 | 9/1964 | Great Britain. | |
| 68,098 | 11/1960 | India. | |

OTHER REFERENCES

Kirk-Othmer, "Encyclopaedia of Chemical Technology," 1st ed., vol. 3, pp. 599, 600, 607 (1949).

MILTON WEISSMAN, Primary Examiner

U.S. Cl. X.R.

201—25, 35